United States Patent
McMillon et al.

(10) Patent No.: US 9,976,409 B2
(45) Date of Patent: May 22, 2018

(54) ASSEMBLY FOR MEASURING TEMPERATURE OF MATERIALS FLOWING THROUGH TUBING IN A WELL SYSTEM

(71) Applicant: Halliburton Energy Services, Inc., Houston, TX (US)

(72) Inventors: Christopher Michael McMillon, Wylie, TX (US); Robert Mitchell Neely, Carrollton, TX (US)

(73) Assignee: Halliburton Energy Services, Inc., Houston, TX (US)

(*) Notice: Subject to any disclaimer, the term of this patent is extended or adjusted under 35 U.S.C. 154(b) by 690 days.

(21) Appl. No.: 14/504,134

(22) Filed: Oct. 1, 2014

(65) Prior Publication Data
US 2015/0098486 A1    Apr. 9, 2015

Related U.S. Application Data

(63) Continuation of application No. 14/389,868, filed as application No. PCT/US2013/063824 on Oct. 8, 2013, now Pat. No. 9,347,307.

(51) Int. Cl.
| | |
|---|---|
| G01K 1/00 | (2006.01) |
| G01K 7/00 | (2006.01) |
| E21B 47/06 | (2012.01) |
| G01K 7/16 | (2006.01) |
| G01K 1/14 | (2006.01) |
| G01K 7/02 | (2006.01) |
| G01K 13/02 | (2006.01) |

(52) U.S. Cl.
CPC ............ *E21B 47/065* (2013.01); *G01K 1/143* (2013.01); *G01K 7/02* (2013.01); *G01K 7/16* (2013.01); *G01K 2013/026* (2013.01); *Y10T 29/49117* (2015.01); *Y10T 29/49826* (2015.01)

(58) Field of Classification Search
USPC ......................................... 374/147, 208, 163
See application file for complete search history.

(56) References Cited

U.S. PATENT DOCUMENTS

| | | | | |
|---|---|---|---|---|
| 3,444,740 | A | * 5/1969 | Davis | ..................... G01K 1/143 136/228 |
| 3,696,677 | A | 10/1972 | Luedeman | |
| 3,789,625 | A | 2/1974 | Rey | |
| 3,881,181 | A | * 4/1975 | Khajezadeh | .......... G01F 1/6845 257/467 |

(Continued)

OTHER PUBLICATIONS

U.S. Appl. No. 14/389,868, Non-Final Office Action dated Oct. 20, 2015, 9 pages.

(Continued)

*Primary Examiner* — Mirellys Jagan
(74) *Attorney, Agent, or Firm* — Kilpatrick Townsend & Stockton LLP

(57) ABSTRACT

An assembly for measuring a temperature of a fluid flowing through a tubing section is provided. The assembly can include the tubing section that can include a reduced-width portion. The reduced-width portion can traverse a circumference of the tubing section. The assembly can also include a temperature measurement component in thermal communication with an inner diameter of the tubing section. A temperature of a fluid flowing through the tubing section can be detected using the temperature measurement component.

17 Claims, 4 Drawing Sheets

(56) References Cited

U.S. PATENT DOCUMENTS

| | | | |
|---|---|---|---|
| 4,527,908 A * | 7/1985 | Arisi | G01K 1/14 |
| | | | 122/448.1 |
| 4,832,121 A | 5/1989 | Anderson | |
| 4,881,406 A | 11/1989 | Coury | |
| 5,370,799 A | 12/1994 | Oddo et al. | |
| 5,691,466 A * | 11/1997 | Lawrence | G01N 27/18 |
| | | | 374/148 |
| 5,740,197 A | 4/1998 | Taggart et al. | |
| 6,234,250 B1 | 5/2001 | Green et al. | |
| 6,322,247 B1 | 11/2001 | Bonne et al. | |
| 6,351,987 B1 | 3/2002 | Winston et al. | |
| 6,361,206 B1 | 3/2002 | Bonne | |
| 6,558,036 B2 * | 5/2003 | Gysling | E21B 47/065 |
| | | | 374/136 |
| 6,604,582 B2 | 8/2003 | Flowers et al. | |
| 6,789,625 B2 | 9/2004 | De Rouffignac et al. | |
| 6,886,631 B2 | 5/2005 | Wilson et al. | |
| 6,994,169 B2 | 2/2006 | Zhang et al. | |
| 7,051,811 B2 | 5/2006 | De Rouffignac et al. | |
| 7,055,604 B2 | 6/2006 | Jee et al. | |
| 7,073,580 B2 | 7/2006 | Wilson et al. | |
| 7,140,434 B2 | 11/2006 | Chouzenoux et al. | |
| 7,210,856 B2 | 5/2007 | Ringgenber | |
| 7,290,601 B2 | 11/2007 | Chalifoux et al. | |
| 7,448,447 B2 | 11/2008 | Walford | |
| 7,597,143 B2 | 10/2009 | Giacomino | |
| 7,644,760 B2 | 1/2010 | Woloson | |
| 7,673,682 B2 | 3/2010 | Daily | |
| 7,863,907 B2 | 1/2011 | Coates | |
| 7,866,407 B2 | 1/2011 | San Martin et al. | |
| 7,938,178 B2 | 5/2011 | Ringgenberg et al. | |
| 8,113,284 B2 | 2/2012 | Jee et al. | |
| 8,122,951 B2 | 2/2012 | Fukuhara et al. | |
| 8,177,425 B2 * | 5/2012 | Grundmann | G01K 13/02 |
| | | | 374/147 |
| 8,182,143 B2 | 5/2012 | Fleming et al. | |
| 8,240,378 B2 | 8/2012 | Sonne et al. | |
| 2001/0053172 A1 * | 12/2001 | Sakowsky | G01K 1/143 |
| | | | 374/147 |
| 2002/0064206 A1 * | 5/2002 | Gysling | E21B 47/065 |
| | | | 374/147 |
| 2003/0145987 A1 | 8/2003 | Hashem | |
| 2004/0112595 A1 | 6/2004 | Bostick, III et al. | |
| 2005/0081618 A1 | 4/2005 | Boucher et al. | |
| 2005/0199391 A1 | 9/2005 | Cudmore et al. | |
| 2005/0217841 A1 * | 10/2005 | Van Den Ende | F28F 27/00 |
| | | | 165/287 |
| 2008/0201080 A1 | 8/2008 | Lovell et al. | |
| 2009/0308601 A1 | 12/2009 | Poe, Jr. et al. | |
| 2010/0012410 A1 | 1/2010 | Pryor et al. | |
| 2010/0153014 A1 | 6/2010 | Kischkat et al. | |
| 2012/0312560 A1 | 12/2012 | Bahr et al. | |

OTHER PUBLICATIONS

U.S. Appl. No. 14/389,868, Notice of Allowance dated Feb. 22, 2016, 7 pages.

"Distributed Temperature Sensing Solutions", retrieved from the Internet at least as early as Feb. 2013, http://www.sensortran.com, 2 pages.

"Downhole fiber optic pressure and temperature sensing solution", retrieved from the Internet at least as early as Feb. 2013, http://www.opsens.com/en/oilandgas/solutions/sensing, 1 page.

"Oil and Gas", retrieved from the Internet at least as early as Feb. 2013, http://www.apsensing.com/applications/oil-gas, 1 page.

"Omega Well Monitoring", retrieved from the Internet at least as early as Feb. 2013, http://www.omegawell.com, 1 page.

Brown, "Downhole Temperature From Optical Fiber", Oilfield Review, vol. 20, No. 4, Winter 2008/2009, pp. 34-39.

Lios Technology, "Distributed Temperature Monitoring of Upstream Applications in the Oil and Gas Industry", retrieved from the Internet at least as early as Feb. 2013, http://www.lios-tech.com/Menu/WELL.DONE/Application, 2 pages.

PCT/US2013/063824, "International Search Report and Written Opinion", dated Jul. 7, 2014, 17 pages.

Smart Fibres, "Multi-Drop Downhole P/T Sensing", retrieved from the Internet at least as early as Feb. 2013, www.smartfibres.com/Attachments/SFref379.pdf, 4 pages.

Taverner et al., "Optical temperature point-sensor array for oil and gas down-hole applications", 19th International Conference on Optical Fibre Sensors, Apr. 14, 2008, 4 pages.

* cited by examiner

ASSEMBLY FOR MEASURING TEMPERATURE OF MATERIALS FLOWING THROUGH TUBING IN A WELL SYSTEM

CROSS-REFERENCE TO RELATED APPLICATIONS

This is a continuation of U.S. patent application Ser. No. 14/389,868 titled "Assembly for Measuring Temperature of Materials Flowing Through Tubing in a Well System," filed Oct. 1, 2014, which is a U.S. national phase under 35 U.S.C. 371 of International Patent Application No. PCT/US2013/063824, filed Oct. 8, 2013, the entireties of which are incorporated herein by reference.

TECHNICAL FIELD

The present disclosure relates generally to devices for use in well systems and, more particularly (although not necessarily exclusively), to assemblies for measuring temperature of materials flowing through tubing sections in a well system.

BACKGROUND

A well system (e.g., oil or gas wells for extracting fluids from a subterranean formation) can include one or more tubing sections through which fluid may flow. Fluid temperatures may be measured at different portions in a well system, such as upstream thermal wells. Prior solutions for measuring temperature of fluids or other materials flowing through a tubing section may provide inaccurate temperature measurements.

Systems and methods are desirable for accurately measuring the temperature of fluids flowing through a tubing section.

DETAILED DESCRIPTION

Figure 1:
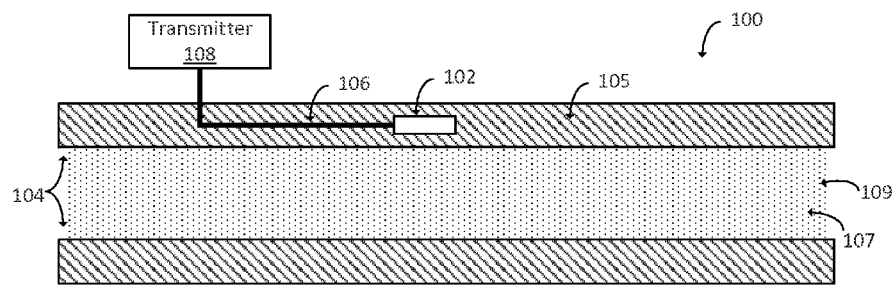
FIG. 1 is a cross-sectional view of an example of an assembly that includes a tubing section having an integrated temperature sensor according to one aspect of the present disclosure.

Certain aspects and features of the present disclosure are directed to assemblies for measuring temperature of fluids or other materials flowing through tubing sections in a well system. An assembly for measuring can include a tubing section and a temperature measurement component in thermal communication with an inner diameter of the tubing section. A temperature of a fluid flowing through the tubing section can be detected using the temperature measurement component.

A temperature component can be any suitable object, device, or system used for determining the temperature of fluid flowing through a tubing section. In some aspects, an assembly for measuring fluid temperature can include a temperature component such as a temperature sensor that is enclosed in the body of a tubing section. The temperature sensor being in thermal communication with the inner diameter of the tubing section can involve the body conducting heat from the inner diameter of the tubing section to the temperature sensor. Heat can be communicated to the body of the tubing section from fluid flowing through inner diameter of the tubing section. The heat communicated to the body of the tubing section can increase the temperature of a portion of the tubing section body surrounding the temperature sensor. The temperature of the body surrounding the sensor can be equal to or similar the temperature of the fluid flowing through the inner diameter of the tubing section. The temperature sensor can measure the temperature of the tubing section body. The temperature sensor can be communicatively coupled to a transmitter or other device for communicating the temperature measurements.

In other aspects, an assembly for measuring fluid temperature can include multiple tubing sections with an expandable element positioned between the tubing sections. The expandable element can be in thermal communication with the inner diameter of the tubing section such that heat can be communicated from fluid flowing through the tubing sections to the expandable element. The expandable element can expand or contract in response to changes in temperature caused by fluid flowing through the tubing sections. Heat can be communicated to the expandable element from the fluid flowing through the inner diameters of the tubing sections. The heat communicated to the expandable element can cause the expandable element to expand or contract. A temperature of the fluid can be determined based on a function relating the expansion or contraction of the expandable element to the temperature of the tubing section.

In other aspects, an assembly for measuring fluid temperature can include a pump for circulating a measurement fluid through one or more channels in the body of a tubing section. The channels can be in thermal communication with the inner diameter of the tubing section such that heat can be communicated from fluid flowing through the tubing sections to a measurement fluid flowing through the channels. The heat communicated to the measurement fluid can increase the temperature of the measurement fluid. The increased temperature of the measurement fluid can be equal to or similar the temperature of the fluid flowing through the inner diameter of the tubing section. The temperature of the heated measurement fluid can be measured to determine the temperature of the fluid flowing through the inner diameter of the tubing section.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects. The following sections use directional descriptions such as "above," "below," "upper," "lower," "upward," "downward," "left," "right," etc. in relation to the illustrative aspects as they are depicted in the figures, the upward direction being toward the top of the corresponding figure and the downward direction being toward the bottom of the corresponding figure, the uphole direction being toward the surface of the well and the downhole direction being toward the toe of the well. Like the illustrative aspects, the numerals and directional descriptions included in the following sections should not be used to limit the present disclosure.

FIG. 1 is a cross-sectional view of an example of an assembly 100 that includes a tubing section 104 having an integrated temperature sensor 102 according to one aspect.

The assembly 100 can include the temperature sensor 102 positioned in a body 105 of the tubing section 104. The body 105 can be formed from a thermally conductive material, such as a suitable metal. The thermally conductive material of the body 105 can allow the temperature sensor 102 to be in thermal communication with an inner diameter 109 of the tubing section 104. Heat can be communicated to the body 105 from fluid 107 flowing through inner diameter 109 of the tubing section 104. The heat communicated to the body 105 can increase the temperature of a portion of the body 105 surrounding the temperature sensor 102. The temperature of the portion of the body 105 surrounding the temperature sensor 102 can be equal to or similar the temperature of the fluid 107. The temperature sensor 102 can measure the temperature of the tubing section 104. The temperature of portion of the tubing section 104 can be used to determine the temperature of the fluid 107.

The position of the temperature sensor 102 in the body 105 can reduce or prevent the temperature measurement from being affected by the environment external to the tubing section 104. For example, the environment external to the tubing section 104 may have a different temperature than the fluid 107. The position of the temperature sensor 102 in the body 105 can also reduce or prevent damage that may result from positioning a temperature sensor directly in contact with the fluid 107.

Any suitable temperature sensor 102 can be used to measure the temperature of the tubing section 104. In one non-limiting example, the temperature sensor 102 may be a resistance temperature detector, such as a length of coiled wire wrapped around a non-conductive core. In another non-limiting example, the temperature sensor 102 may be a thermocouple. A thermocouple can include two conductors formed from different materials. The two conductors can produce a voltage near a junction at which the two conductors are in contact. The voltage produced is dependent on the difference of temperature of the junction to other parts of the conductors. The temperature of the pipe can be determined from the voltage produced by the thermocouple.

The temperature sensor 102 can be communicatively coupled to a transmitter 108 or other device. The transmitter 108 can communicate the temperature measurements or other data associated with the temperature of the fluid 107. For example, the temperature sensor 102 can include one or more lead wires 106 for connecting the temperature sensor 102 to a transmitter 108, as depicted in FIG. 1. The transmitter 108 can transmit the temperature measurements to a control unit or other device.

Figure 2:
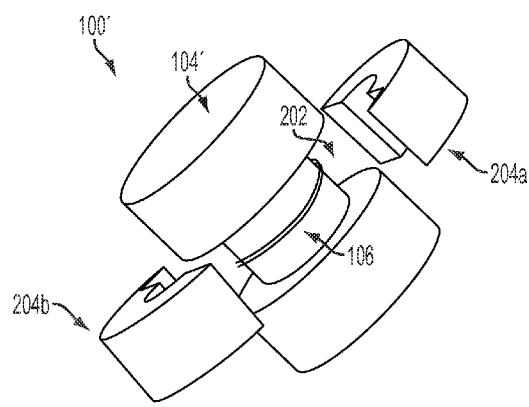
FIG. 2 is an exploded perspective view of an alternative example of an assembly that includes a tubing section having an integrated temperature sensor according to one aspect of the present disclosure.
Figure 3:
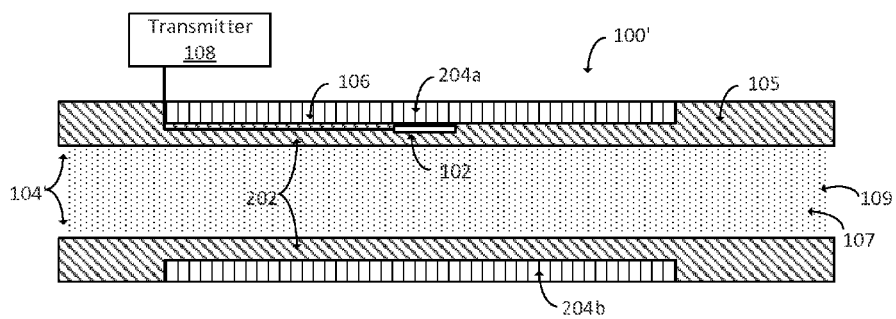
FIG. 3 is a cross-sectional view of the assembly of FIG. 2 according to one aspect of the present disclosure.

FIG. 2 is an exploded perspective view of an assembly 100' that includes a tubing section 104' having an integrated temperature sensor 102 according to one aspect. The tubing section 104' can be manufactured with a reduced-width portion 202. The reduced-width portion 202 can include a smaller cross-section area than other portions of the body 104'. One or more sleeves 204a, 204b can be positioned around the reduced-width portion 202, as depicted in the cross-sectional view of FIG. 3. The sleeves 204a, 204b can be welded or otherwise attached to the tubing section 104'.

Any suitable thickness of the reduced-width portion 202 can be used. For example, a suitable thickness of the reduced-width portion 202 can be a thickness that allows for an accurate measurement of the temperature of the body 105' without damaging the temperature sensor 102.

Figure 4:
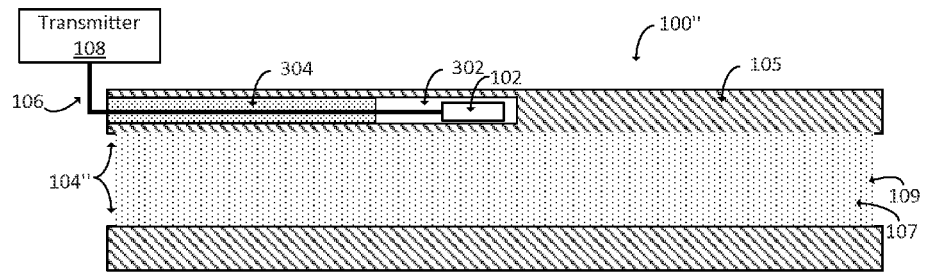
FIG. 4 is a cross-sectional view of another alternative example of an assembly that includes a tubing section having an integrated temperature sensor according to one aspect of the present disclosure.

In additional or alternative aspects, the tubing section 104" with an integrated temperature sensor 102 can be manufactured without using a reduced-width portion 202 and sleeves 204a, 204b. For example, FIG. 4 is a cross-sectional view of an assembly 100" that includes a tubing section 104" having a temperature sensor 102 positioned in a chamber 302. The tubing section 104" can be manufactured to include the chamber 302 in which the temperature sensor 102 can be positioned. In one non-limiting example, the chamber 302 can be milled into the tubing section 104". In another non-limiting example, a mold can be used to form the chamber 302 in the tubing section 104" during the manufacturing of the tubing section 104". A suitable sealant 304 can be placed in the chamber 302 adjacent to or surrounding the temperature sensor 102. The sealant 304 can also surround the lead wires 106. A non-limiting example of a suitable sealant is an epoxy. The sealant 304 can prevent fluid or other material from entering the chamber 302.

Figure 5:
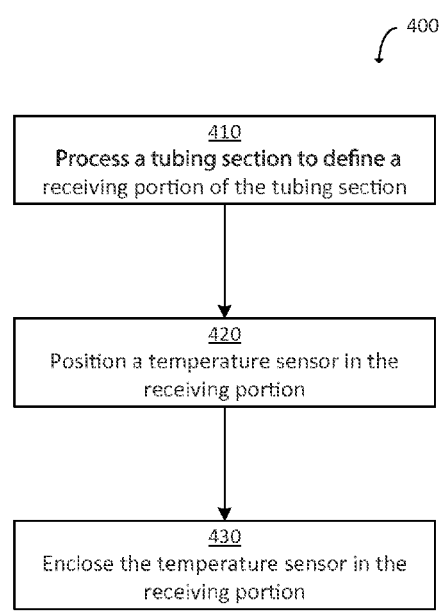
FIG. 5 is a flow chart illustrating an example method for manufacturing a tubing section with an integrated temperature sensor according to one aspect of the present disclosure.

An assembly 100 including an integrated temperature sensor 102 can be formed via any suitable manufacturing process. For example, FIG. 5 is a flow chart illustrating an example method for manufacturing a tubing section with an integrated temperature sensor.

The method 400 involves processing a tubing section 104 to define a receiving portion of the tubing section 104, as shown in block 410. In some aspects, processing the tubing section 104 to define the receiving portion can involve using a milling tool or other suitable tool to cut a reduced-width portion 202 into the body 105. In other aspects, processing the tubing section 104 to define the receiving portion of the tubing section 104 can involve using a milling tool or other suitable tool to cut a chamber 302 into the body 105. In other aspects, processing the tubing section 104 to define the receiving portion of the tubing section 104 can involve forming the body 105 using one or more molds to define a receiving portion.

The method 400 further involves positioning a temperature sensor 102 in the receiving portion, as shown in block 420.

The method 400 further involves enclosing the temperature sensor 102 in the receiving portion, as shown in block 430. Any suitable process may be used to enclose the temperature sensor 102 in the receiving portion. In some aspects, the temperature sensor 102 can be enclosed by positioning one or more sleeves 204a, 204b in a reduced-width portion 202 external to the temperature sensor 102 and surrounding the temperature sensor 102. The sleeves 204a, 204b can be coupled to the body 105 of the tubing section 104 via any suitable process, such as (but not limited to) welding the sleeves 204a, 204b to the body 105. In other aspects, the temperature sensor 102 can be enclosed by injecting a sealant 304 into a chamber 302 adjacent to the temperature sensor 102.

Figure 6:
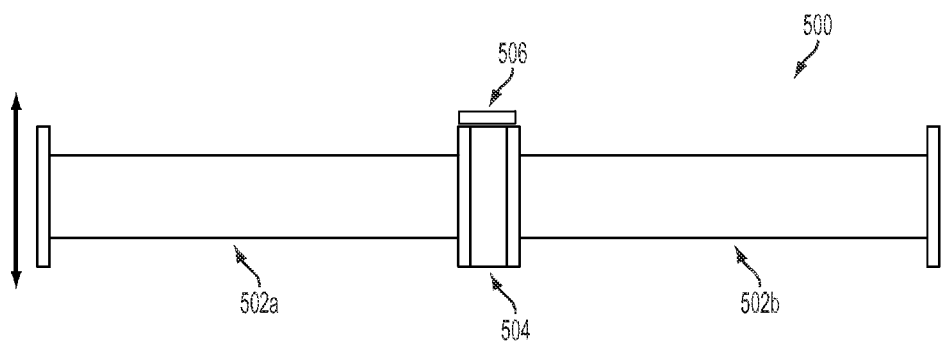
FIG. 6 is a lateral view of an example of an assembly that includes tubing sections with an expandable element for determining fluid temperature according to one aspect of the present disclosure.

In additional or alternative aspects, a temperature measurement component can include a component with one or more properties that change in response to changes in temperature. For example, FIG. 6 is a lateral view of an assembly 500 that includes tubing sections 502a, 502b with an expandable element 504 that can be used for determining fluid temperature. The expandable element 504 can be positioned between the tubing sections 502a, 502b. The expandable element 504 can be expand or contract in response to changes in temperature. The expandable element 504 can include any suitable material that expands or contracts in response to changes in temperature, such as (but not limited to) steel or other metals.

Fluid flowing through the tubing sections 502a, 502b can change the temperature of the expandable element 504. The tubing sections 502a, 502b can be formed from a thermally conductive material, such as metal. The thermally conductive material can provide a thermal communication path between the expandable element 502 and inner diameters of the tubing sections 502a, 502b. Heat can be communicated to the expandable element 504 from the fluid flowing through the inner diameters of the tubing sections 502a, 502b. The heat communicated to the expandable element 504 can cause the expandable element to expand or contract. A temperature of the fluid flowing through the tubing sections 502a, 502b can be determined based on a function relating the expansion or contraction of the expandable element 504 to the temperature of the tubing sections 502a, 502b.

In some aspects, the expandable element 504 can expand or contract in a radial direction with respect to the tubing sections 502a, 502b. The radial direction is depicted in FIG. 6 by the double-sided arrow perpendicular to the tubing sections 502a, 502b. A suitable sensing device can measure the radial expansion or contraction of the expandable element 504. One non-limiting example of a suitable sensing device is a strain gauge 506, as depicted in FIG. 6.

In other aspects, the expandable element 504 can expand or contract in an axial direction with respect to the tubing sections 502a, 502b. A suitable sensing device can measure the radial expansion or contraction of the expandable element 504. One non-limiting example of a suitable sensing device is a strain gauge.

Figure 7:
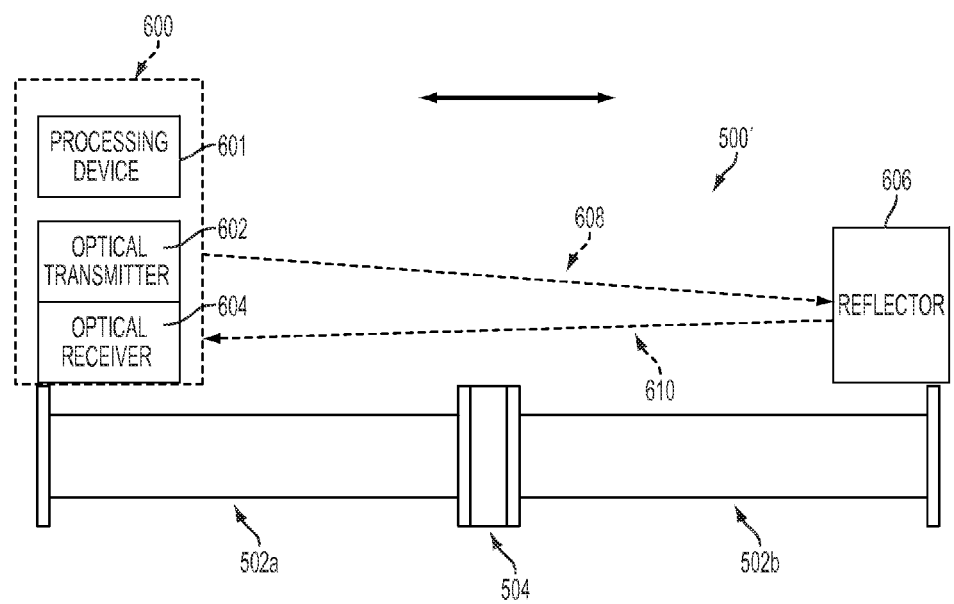
FIG. 7 is a lateral view of an alternative example of an assembly that includes tubing sections with an expandable element for determining fluid temperature according to one aspect of the present disclosure.

Another non-limiting example of a suitable sensing device is an optical range finding system. For example, FIG. 7 is a lateral view of an assembly 500' that includes an optical range finder 600 coupled to the tubing section 502a. The optical range finder 600 can include an optical transmitter 602 and an optical receiver 603. A reflector 604 can be coupled to the tubing section 502b. The optical transmitter 602 can transmit optical signals 605. The reflector 604 can reflect the optical signals 605. The optical receiver 603 can receive the reflected optical signals 606. A time delay between the transmission of the optical signals 605 and the reception of the reflected optical signals 606 can correspond to a distance between the optical range finder 600 and the reflector 604. The processing device 601 can determine the distance between the optical range finder 600 and the reflector 604.

The expandable element 504 can expand or contract in the axial direction. The axial direction is depicted in FIG. 7 by the double-sided arrow parallel to the tubing sections 502a, 502b. Expansion or contraction of the expandable element 504 in the axial direction can change the distance between the optical range finder 600 and the reflector 604. The expansion or contraction can be determined from the change in the distance.

Figure 8:
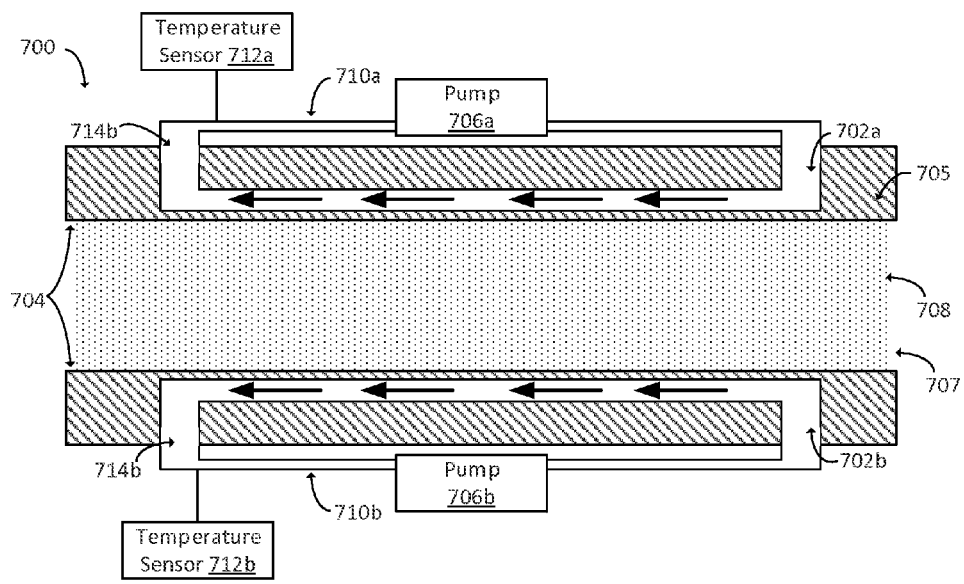
FIG. 8 is a lateral cross-sectional view of an example of an assembly that includes one or more pumps for circulating a measurement fluid through one or more channels in a tubing section according to one aspect of the present disclosure.

In additional or alternative aspects, a temperature measurement component can be a portion of the tubing section through which a measurement fluid can flow. For example, FIG. 8 is a lateral cross-sectional view of an assembly 700 that includes one or more pumps 706a, 706b for circulating a measurement fluid through one or more channels 702a, 702b in a tubing section 704 according to one aspect.

The channels 702a, 702b can be defined in the body 705 of the tubing section 704. The pumps 706a, 706b can be in fluid communication with the respective channels 702a, 702b via respective control lines 710a, 710b. The pumps 706a, 706b can pump measurement fluid through the channels 702a, 702b. The flow of the measurement fluid is depicted by the leftward arrows in FIG. 8. Although FIG. 8 depicts two pumps 706a, 706b for illustrative purposes, any number of pumps can be used. For example, in some aspects, a single pump can be in fluid communication with multiple channels through a tubing section.

The body 705 of the tubing section 704 can be formed from a thermally conductive material that allows thermal communication between the inner diameter 707 of the tubing section 704 and the channels 702a, 702b. Heat can be communicated to the measurement fluid in the channels 702a, 702b from the fluid 708 flowing through inner diameter 707 of the tubing section 704. The heat communicated to the measurement fluid from the fluid 708 can increase the temperature of the measurement fluid. The temperature of the measurement fluid can be equal to or similar the temperature of the fluid 708.

The temperature of the heated measurement fluid can be measured using one or more temperature sensors 712a, 712b. The temperature sensors 712a, 712b can be thermally coupled to the respective outlets 714a, 714b of the channels 702a, 702b. The temperature of the fluid 708 can be determined from the measurements of the temperature sensors 712a, 712b.

Figure 9:
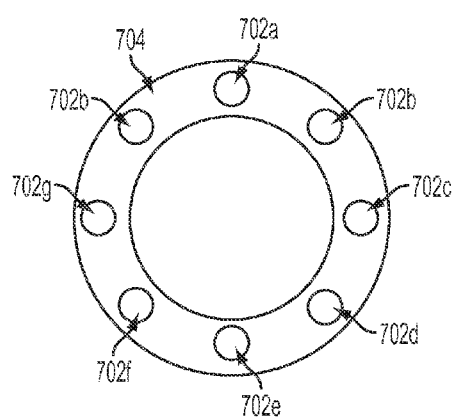
FIG. 9 is a longitudinal cross-sectional view of the tubing section of FIG. 8 according to one aspect of the present disclosure.

Any number of channels can be defined by the body 705 of the tubing section 704. For example, FIG. 9 is a longitudinal cross-sectional view of the tubing section 704 that includes channels 702a-g.

In some aspects of the present disclosure, an assembly for measuring a temperature of a fluid flowing through a tubing section is provided. The assembly can include a tubing section and a temperature measurement component. The temperature measurement component can be in thermal communication with an inner diameter of the tubing section. A temperature of a fluid flowing through the tubing section can be measured or otherwise determined using the temperature measurement component. In some aspects, the temperature measurement component can include a temperature sensor enclosed in a body of the tubing section. In some aspects, the body can define a reduced-width portion and a sleeve surrounding the reduced-width portion and coupled to the tubing section. The reduced-width portion can have a smaller cross-sectional area than other portions of the body. The temperature sensor can be positioned in the reduced-width portion. In other aspects, the body can define a chamber. The temperature sensor can be positioned in the chamber and a sealant is positioned in the chamber adjacent to the temperature sensor. In additional or alternative aspects, the assembly with the enclosed temperature sensor can include a transmitter communicatively coupled to the temperature sensor. The transmitter can transmit data associated with the temperature of the fluid.

In additional or alternative aspects, the temperature measurement component can include one or more channels defined by a body of the tubing section. In some aspects, the channel can be parallel with a direction of fluid flow through the tubing section. The assembly can include one or more pumps in fluid communication with the one or more channels. The pump can circulate a measurement fluid through the channel. A temperature sensor connected to one or more outlets of the one or more channels can measure a temperature of the measurement fluid.

In additional or alternative aspects, the temperature measurement component can include an expandable element coupled to the tubing section. The expandable element can expand in response to a change in the temperature of the fluid. The assembly can include a sensing device that determines an amount by which the expandable element expands or contracts in response to the change in the temperature of the fluid. In some aspects, the sensing device can include a strain gauge adjacent to the expandable element. In other aspects, the assembly further can include an additional tubing section and the expandable element can be positioned between the tubing section and the additional tubing section. The sensing device can include an optical range finder coupled to at least one of the tubing section and the additional tubing section. The optical range finder can measure a distance between a point on the tubing section and a point on the additional tubing section. In some aspects, the expandable element is expandable in a radial direction with respect to the tubing section. In other aspects, the expandable element is expandable in an axial direction with respect to the tubing section.

In additional or alternative aspects, a method of manufacturing an assembly for measuring a temperature of a fluid is provided. The method can involve processing a tubing section to define a receiving portion of the tubing section, positioning a temperature sensor in the receiving portion, and enclosing the temperature sensor in the receiving portion. In some aspects, processing the tubing section to define the receiving portion of the tubing section can include cutting a body of the tubing section to define a reduced-width portion of the body and wherein enclosing the temperature sensor can include positioning a sleeve external to the receiving portion and surrounding the temperature sensor and coupling the sleeve to the body of the tubing section. In other aspects, processing the tubing section to define the receiving portion of the tubing section can include cutting a chamber into the tubing section and enclosing the temperature sensor can include injecting a sealant into the chamber. In additional or alternative aspects, the method can involve connecting the temperature sensor to one or more lead wires, extruding at least portion of the one or more lead wires from the tubing section, and connecting a transmitter to the lead wire.

The foregoing description of the disclosure, including illustrated aspects and examples has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure. Aspects and features from each example disclosed can be combined with any other example.

What is claimed is:

1. An assembly comprising:
    a tubing section comprising a reduced-width portion traversing an entire circumference of the tubing section; and
    a temperature measurement component positioned in the reduced-width portion and in thermal communication with an inner diameter of the tubing section, wherein a temperature of a fluid flowing through the tubing section is detectable via the temperature measurement component.

2. The assembly of claim 1, wherein the temperature measurement component comprises a temperature sensor enclosed in the reduced-width portion of the tubing section by a sleeve, and wherein the assembly further comprising a transmitter communicatively coupled to the temperature sensor, the transmitter operable for transmitting data associated with the temperature of the fluid.

3. The assembly of claim 1, wherein multiple sleeves collectively surround the entire circumference of the tubing section and enclose the temperature measurement component in the reduced-width portion, wherein the multiple sleeves are welded to the tubing section.

4. The assembly of claim 1, wherein the tubing section comprises a thermally conductive material.

5. The assembly of claim 1, wherein the temperature measurement component comprises at least one of a resistance temperature detector or a thermocouple.

6. The assembly of claim 1, wherein a first portion of the tubing section is adapted to contact the fluid and a second portion of the tubing section in contact with the temperature measurement component is adapted to have a lower temperature than the first portion when the first portion is contacting the fluid.

7. The assembly of claim 1, wherein the assembly is usable with a well system and the fluid is a well fluid.

8. An assembly comprising:
    a tubing section;
    a temperature sensor enclosed in a reduced-width portion of the tubing section, wherein the reduced-width portion traverses a circumference of the tubing section, wherein the temperature sensor is in thermal communication with an inner diameter of the tubing section, and wherein a temperature of a fluid flowing through the tubing section is detectable via the temperature sensor; and
    multiple sleeves external to the reduced-width portion, the multiple sleeves positioned for enclosing a portion of the reduced-width portion and collectively surrounding an entire circumference of the tubing section.

9. The assembly of claim 8, further comprising a transmitter communicatively coupled to the temperature sensor, the transmitter operable for transmitting data associated with the temperature of the fluid.

10. The assembly of claim 8, wherein the reduced-width portion has a smaller cross-sectional area than other portions of a body of the tubing section, wherein the temperature sensor is positioned in the reduced-width portion.

11. The assembly of claim 8, wherein the reduced-width portion defines a chamber, wherein the temperature sensor is positioned in the chamber, wherein a sealant is positioned in the chamber adjacent to the temperature sensor.

12. The assembly of claim 8, wherein the tubing section comprises a thermally conductive material.

13. The assembly of claim 8, wherein the temperature sensor comprises at least one of a resistance temperature detector or a thermocouple.

14. A method of manufacturing an assembly for measuring a temperature of a fluid, the method comprising:
  processing a tubing section to define a reduced-width portion of the tubing section, wherein the reduced-width portion traverses a circumference of the tubing section;
  positioning a temperature sensor in the reduced-width portion; and
  enclosing the temperature sensor in the reduced-width portion with multiple sleeves that collectively surround an entire circumference of the tubing section.

15. The method of claim 14,
  wherein processing the tubing section to define the reduced-width portion of the tubing section comprises cutting a body of the tubing section to define the reduced-width portion; and
  wherein enclosing the temperature sensor comprises:
    positioning the multiple sleeves external to the reduced-width portion and surrounding the temperature sensor; and
    coupling the multiple sleeves to the body of the tubing section.

16. The method of claim 14, further comprising:
  connecting the temperature sensor to a lead wire;
  extruding a portion of the lead wire from the tubing section; and
  connecting a transmitter to the lead wire.

17. The method of claim 14, wherein the temperature sensor comprises at least one of a resistance temperature detector or a thermocouple.

* * * * *